July 28, 1931.  D. D. ROWLEY ET AL  1,816,196
SCREEN FOR AUTOMOBILES
Filed July 5, 1929
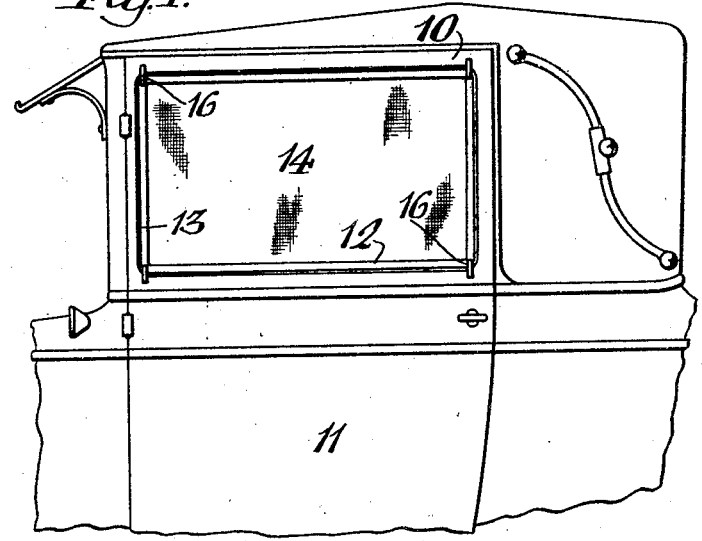
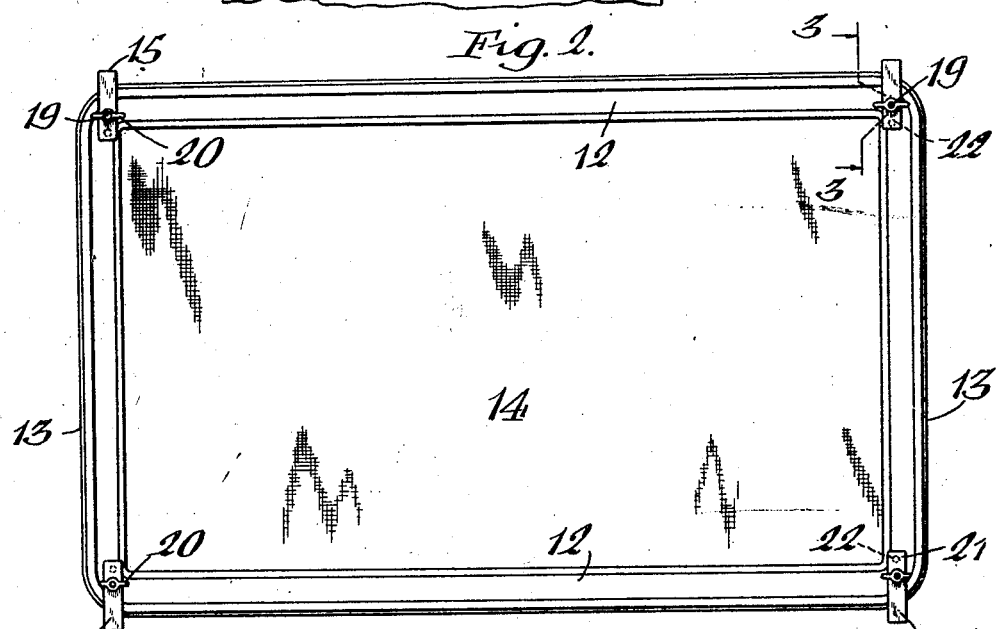
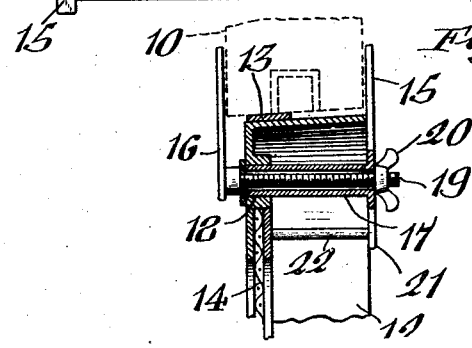
Inventors,
Donald D. Rowley,
David M. McLellan,
by Walter P. Geyer
Attorney Patented July 28, 1931

1,816,196

UNITED STATES PATENT OFFICE

DONALD D. ROWLEY AND DAVID M. McLELLAN, OF BUFFALO, NEW YORK

SCREEN FOR AUTOMOBILES

Application filed July 5, 1929. Serial No. 375,920.

This invention relates to improvements in screens designed for attachment to the glass window panels of closed automobile bodies.

Its chief object is to provide a screen of this character which is comparatively simple and inexpensive in construction, and which is provided with novel and effective means for readily and reliably securing the screen in place within the window panel.

In the accompanying drawings:—

Figure 1 is a fragmentary side view of an automobile showing my improved screen applied to the window panel of the door. Figure 2 is an enlarged face view of the screen. Figure 3 is an enlarged, fragmentary cross section thereof, taken on line 3—3, Figure 2.

Similar characters of reference indicate corresponding parts throughout the several views.

By way of example, we have shown our improved screen applied to the window panel 10 of an automobile door 11, it being understood that the screen is insertable in the window opening when the customary glass has been lowered for ventilation purposes.

The screen preferably consists of a metallic frame 12 of angle shape in cross section and of the proper outside contour to fit the panel-opening. As seen in Figure 3, the outer wall of the frame is slightly tapered outwardly to conform to the customary taper of the panel-opening, the screen being applied to the latter from the inside of the car and the taper preventing displacement of the screen outwardly. If desired a cushion strip 13 of rubber or other appropriate material may be applied to the outer wall of the frame to prevent its rattling. The screening material 14 may be secured to the frame in any suitable manner.

Located adjacent to the four corners of the screen-frame are clamping devices which serve to detachably hold the same in the panel-opening. Each of these devices preferably consists of inner and outer clamping arms or straps 15, 16 adapted to be projected outwardly or laterally beyond the screen-frame by a swinging motion into gripping relation with the opposite marginal sides of the opening of the window-panel 10 to hold such frame in place, or to be retracted within the dimensional area of the frame to permit its insertion and removal. The inner arm 15 is applied to sleeve 17 disposed transversely of the frame 12 and engaging an opening 18 in the inwardly directed side of said frame. The outer arm 16 has a stem or shank 19 telescopically fitted within the arm sleeve, the former being threaded and having a wing-nut 20 at its inner end for holding the arms in their proper relative positions. For the purpose of insuring the contraction of the arms to reliably clamp the screen to the window-panel, the inner arm 15 is preferably provided with an opposing extension 21 disposed diametrically on the other side of its sleeve-axis and having a brace-rod 22 projecting therefrom and of the proper length for abutting engagement with the inner wall of the screen-frame, as shown in Figure 3. By this construction, as the wing-nut 20 is turned home, the rod abuts against the screen-frame and thereby tends to draw or force the arms toward the marginal portion of the panel-opening into firm clamping engagement therewith.

Upon loosening the wing-nuts of the corner-clamps and turning their arms 15, 16 within the confines of the frame, the latter may be readily applied to or removed from the panel-opening; the same can be quickly secured in place by merely turning the arms to the position shown in the drawings and then tightening up on the wing-nuts, which effectively hold the screen firmly in place and prevent rattling thereof.

We claim as our invention:—

1. A clamping device for detachably securing a screen in a window panel, comprising a pair of oppositely disposed side clamping members having telescopically joined shanks about which said members are adapted to swing into and out of clamping position, one of said members having an opposing extension, and a brace rod carried by said member-extension in substantially parallel relation to said shanks for abutting engagement with the screen in the clamped position of the parts.

2. A clamping device for detachably securing a screen in a window panel, comprising a pair of oppositely disposed side clamping members having telescopically joined shanks about which said members are adapted to swing into and out of clamping position, one of said shanks being in the form of a sleeve and the other in the form of a threaded stem extending through the sleeve, the sleeve-bearing member having an opposing extension carrying a brace rod projecting laterally therefrom for abutting engagement with the screen in the clamped position of the parts, and a nut applied to said stem.

DONALD D. ROWLEY.
DAVID M. McLELLAN.